Nov. 29, 1932. J. H. TODD 1,889,391
MOWER
Filed Aug. 5, 1931 4 Sheets-Sheet 3
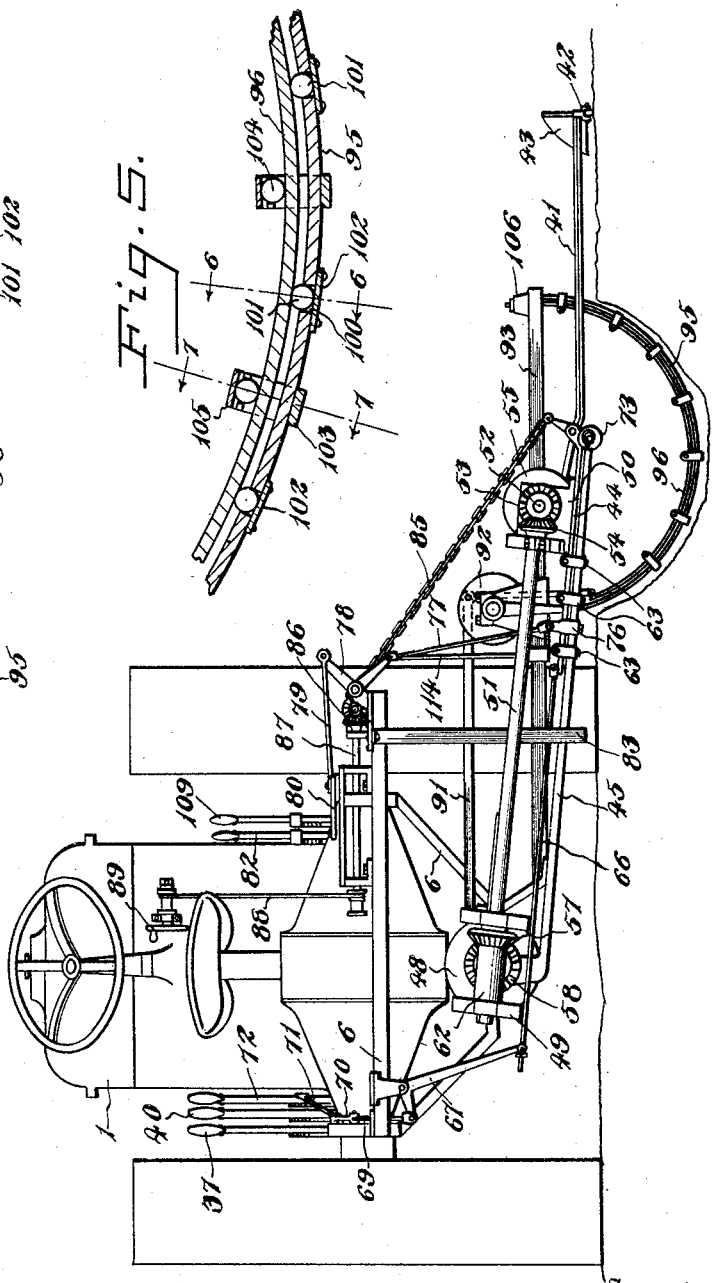

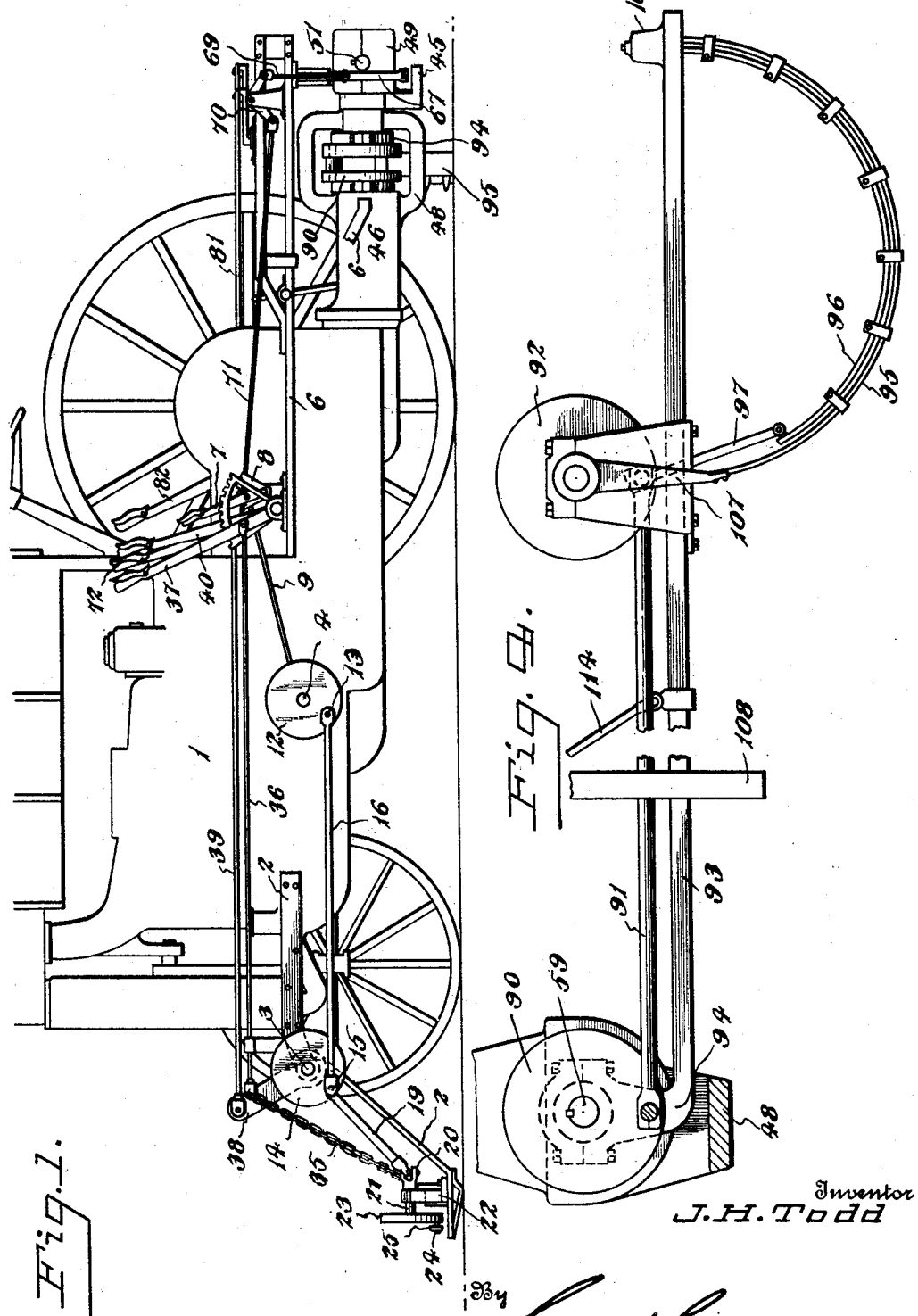

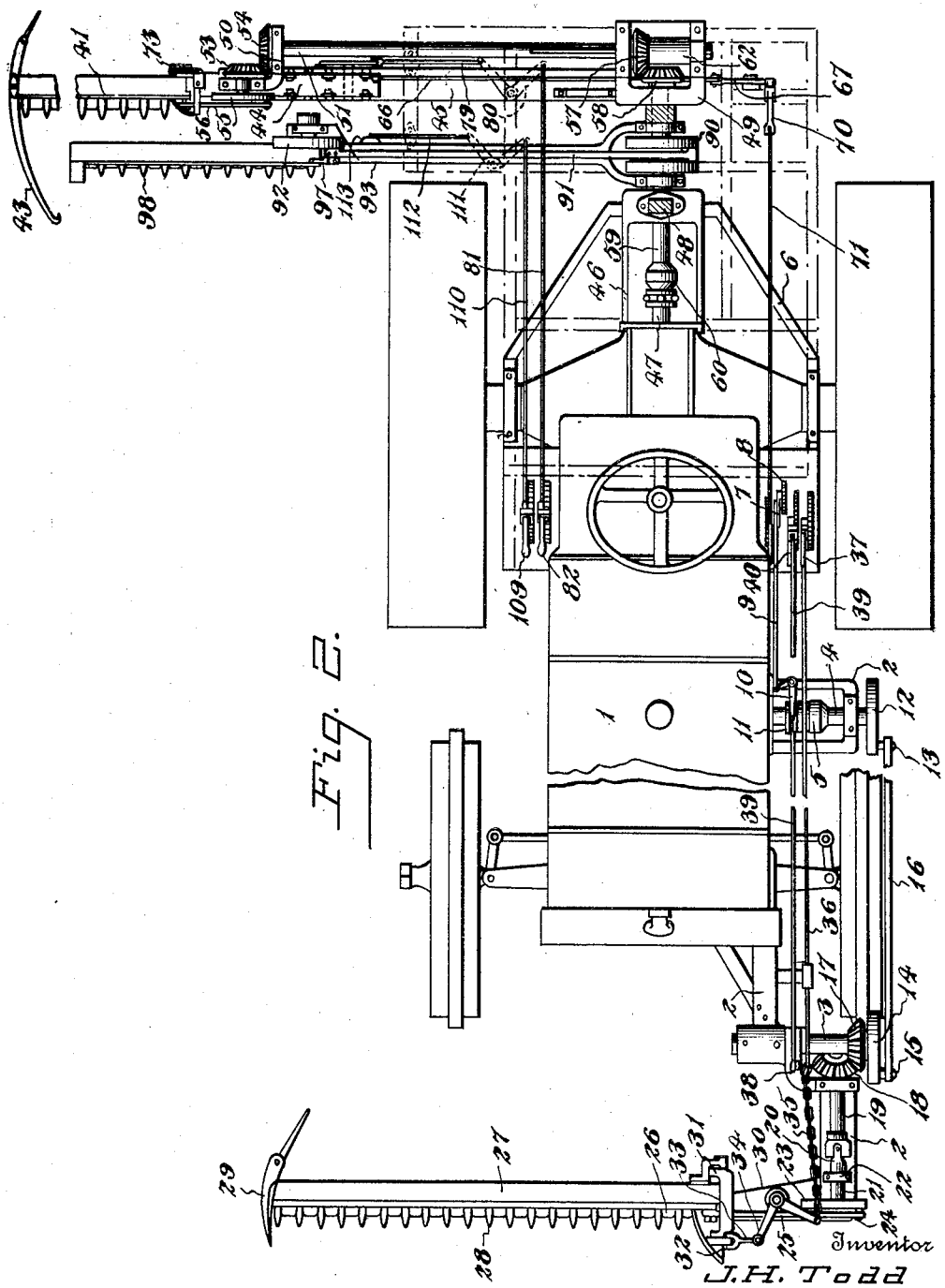

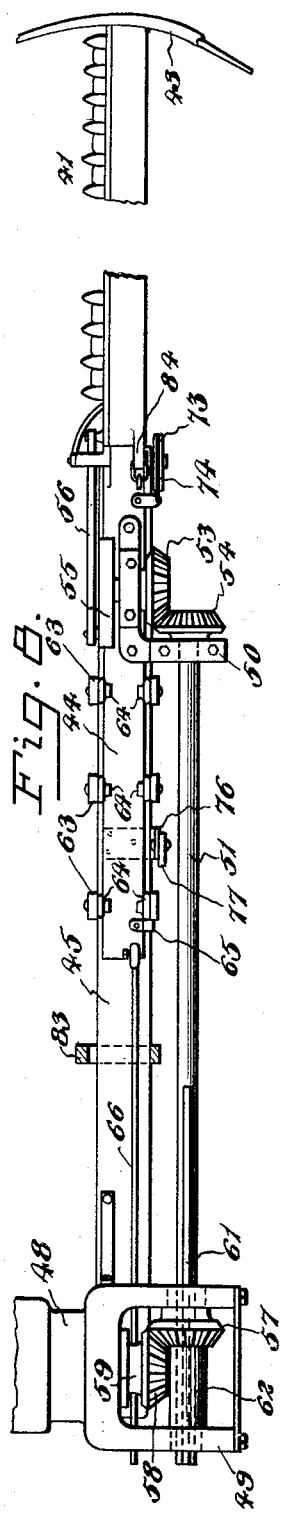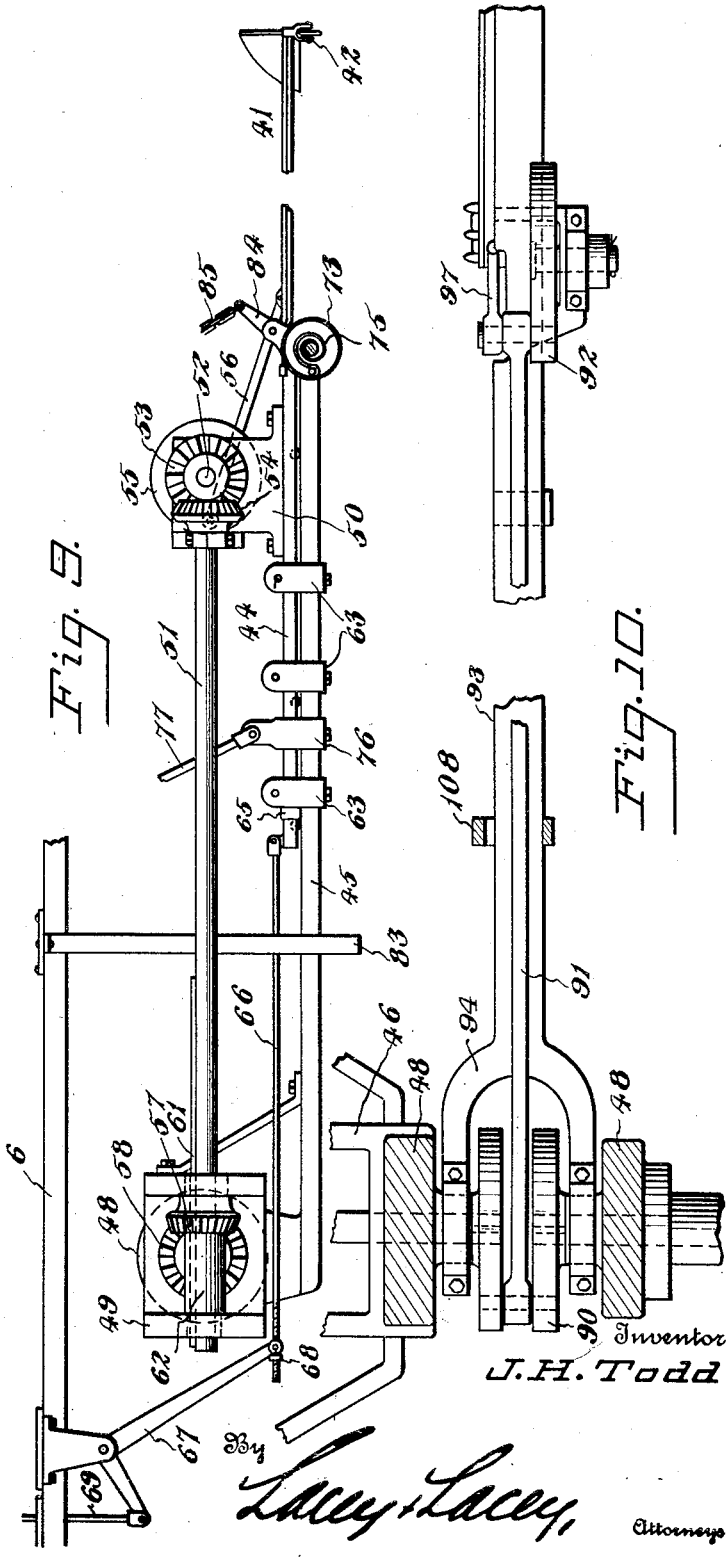

Patented Nov. 29, 1932

1,889,391

UNITED STATES PATENT OFFICE

JAMES H. TODD, OF MARION, OHIO

MOWER

Application filed August 5, 1931. Serial No. 555,337.

The object of this invention is to provide mowing apparatus designed particularly for use in removing vegetation from a roadway and which may be mounted upon and driven by a tractor. A particular object of the invention is to provide a simple and efficient mechanism whereby grass and other growth within a ditch at the side of the roadway may be cut down, and another object is to provide cutting mechanism whereby the growth at the side of a roadway may be mowed over a greater or less width, according to circumstances. The stated objects and other objects which will incidentally appear in the course of the following description are attained in such a mechanism as is illustrated in the accompanying drawings, and the invention resides in certain novel features which will be particularly pointed out in the appended claims.

In the drawings,

Figure 1 is a side elevation of a tractor with the apparatus of my invention mounted thereon, Fig. 2 is a top plan view of the same, Fig. 3 is a rear elevation of the same, Fig. 4 is a detail elevation of the arcuate cutter provided for operating in a ditch, Fig. 5 is an enlarged longitudinal section of a portion of the arcuate cutting apparatus, Fig. 6 is a detail section on the line 6—6 of Fig. 5, Fig. 7 is a detail section on the line 7—7 of Fig. 5, Fig. 8 is an enlarged plan view of the rear cutter, Fig. 9 is an enlarged rear elevation of the rear cutter, Fig. 10 is an enlarged detail plan view of a part of the mechanism for driving the arcuate cutter.

The tractor, indicated at 1, may be of any known or approved type. In carrying out the present invention, side frames 2 are secured upon the left-hand side of the tractor at the front end thereof, and mounted in said frames are a front transverse shaft 3 and a rear transverse shaft 4, the latter being equipped with a friction clutch 5 which may be of any approved form and is illustrated in a conventional manner only, said clutch serving to couple the shaft to a lateral power take-off shaft extending from the motor of the tractor. A rear extension frame or platform 6 is secured to the rear end of the tractor and extends rearwardly beyond the same, as will be understood upon reference to Figs. 1 and 2. Mounted upon the supplemental or extension frame 6, at the side of the tractor and within convenient reach of the operator, is a hand lever 7 cooperating with a rack or segment 8 and connected by a link 9 with a bell crank lever 10, fulcrumed upon the frame 2 adjacent the power take-on shaft and having one end engaged in a shifting collar 11 slidably mounted upon the shaft and connected with one member of the friction clutch whereby the shaft 4 may be engaged with or disengaged from the power take-off shaft at will. Upon the outer end of the shaft 4 is carried a crank disk 12 having an eccentric wrist pin 13, and a similar crank disk 14 is carried on the outer end of the shaft 3, said crank disk 14 having an eccentric wrist pin 15, and a connecting rod 16 being pivoted at its ends upon the respective wrist pins. The rotation of the shaft 4 will thus be transmitted to the shaft 3. Upon the shaft 3, at the inner side of the crank disk 14, is a bevel gear 17 which meshes with a bevel gear 18 on the rear end of a transmission shaft 19 journaled in the frame 2 and extending forwardly, the front end of said shaft 19 being connected by a universal joint 20 with a short shaft 21 mounted in a bearing 22 at the lower front end of the frame 2 or an extension thereof, as will be understood upon reference to Figs. 1 and 2. Upon the front end of the short shaft 21 is a crank disk 23 having an eccentric wrist pin 24 on its front face, and a pitman 25 extends inwardly from said wrist pin to a cutter bar 26 and is pivoted to the end of the cutter bar whereby, when the shaft 4 is operating, the cutter bar will be reciprocated. The cutter bar 26 is mounted in a finger bar 27 of any well-known form, and the knives of the cutter bar play through guard fingers 28 in a well-known manner. The finger bar 27 is equipped at its free end with a divider and runner 29 which is adapted to run upon the ground and support the end of the bar and also divide the long grass and lift the fallen grass sufficiently to permit the cutters to readily sever the same. The cutter bar is supported by a lateral extension 30 of the supplemental frame 2 through hinge joints, indicated at 31 and 32, and to the forward joint 32 is attached a link 33 which connects the same with a bell crank lever 34 fulcrumed at its angle upon the extension 30, as shown clearly in Fig. 2. A chain or cable 35 is attached to the bell crank 34 and also to the front end of a connecting rod 36 which is mounted in suitable guides upon the side of the tractor and is connected at its rear end to a hand lever 37 fulcrumed upon the frame 6 at the side of the tractor and cooperating with a holding rack whereby it may be held in a set position. By suitably manipulating the hand lever 37, the cutter bar may be swung about its hinge connection with the frame so as to operate at any desired angle or to be disposed in an elevated position above the ground when it is not to operate and the machine is merely being transported from one place to another place. The forward downward extension of the supplemental frame is mounted upon the shaft 3 or the bearings therefor so that it may rock upon the same as a center, and includes an arm 38 fixed thereto and rising therefrom. A connecting rod 39 is pivoted at its front end to the upper end of this arm 38 and, at its rear end, to a hand lever 40 mounted adjacent the levers 7 and 37, so that by properly manipulating the hand lever 40 the entire cutting apparatus may be raised or lowered and the cutter bar consequently set to mow the grass or other vegetation at a desired height above the ground surface.

As shown and as will be understood from the foregoing description, the cutter bar 27 is disposed transversely of the tractor and in advance of the front end of the same and is adapted to cut down vegetation at the side of the road and immediately in the path of the tractor. To facilitate the mowing operations and remove vegetation at the side of the road to a greater width, a rear cutter, indicated at 41, is provided, and the finger bar of this cutter has its outer end supported by a caster 42 adapted to run upon the ground. It is also equipped with a divider shoe 43 whereby the grass or the growth in the path of the extremity of the cutter will be divided and lifted to be readily acted upon by the cutter.

This divider shoe 43 is arcuate in form, as shown in Fig. 2, so that its front end extends inwardly across the line of travel and, consequently, presents an oblique surface to any obstruction which may be met whereby as the shoe moves forward it will also be shifted to the left and the cutter will also be shifted so that it will not be damaged by contact with the obstruction. The inner end of the cutter 41 is connected to a carrier 44 which is mounted for reciprocation upon a lateral frame 45. Secured to and projecting from the rear end of the tractor is a frame 46 forming a support for the power take-off shaft 47 and having an open vertically expanded portion 48 on the rear side of which is a hollow journal. A yoke 49 is rotatably mounted on said hollow journal and the lateral frame 45 is secured to said yoke. Upon the carrier 44 is mounted a bearing bracket 50 in which is journaled one end of a shaft 51, which extends transversely of the tractor, and the front end of a short shaft 52, the rear end of the shaft 52 being equipped with a bevel gear 53 meshing with a bevel gear 54 on the end of the shaft 51. On the front end of the shaft 52 is a crank disk 55 to which is pivoted the inner end of a pitman 56 extending to and pivoted to the cutter bar of the cutter 41 whereby the cutter bar will be reciprocated when the shaft 51 is operated. Upon the end of the shaft 51, remote from the gear 54, is fitted a bevel gear 57 meshing with a bevel gear 58 on the rear end of a crank shaft 59. The crank shaft 59 is journaled in the frame 46, 48, and the yoke 49, and may be connected with or disconnected from the shaft 47 of the tractor motor at will through a friction clutch 60. It may be noted at this point that I employ friction clutches inasmuch as they will yield in the event either cutter encounters an obstruction, so that damage which would otherwise occur will be avoided. The shaft 51 is slidable through the gear 57 but is splined therein, as shown at 61, so that it is constrained to rotate therewith, and a spacing sleeve 62 is fitted around the shaft between the gear 57 and the side of the yoke so that the gear will be held in proper operative position. The driving gearing will thus be always in operative position although it will permit shifting to accommodate the lateral shifting of the cutter when the divider shoe 43 meets an immovable obstruction. A plurality of U-shaped brackets 63 are secured upon the under side of the frame 45 and rise past the sides thereof, flanged rollers 64 being mounted on the upper ends of the brackets to extend over the carrier 44 and hold it down upon the frame. A stop projection 65 on the rear edge of the carrier limits the movement of the same to the right by impinging against the innermost bracket 63 as will be understood upon reference to Fig. 8. Attached to the left end of the carrier 44 and extending to the left therefrom is a rod 66, the left hand end of which extends loosely through the lower end of an angle lever 67 and has threaded engagement with a nut 68 which abuts the left side of the lever. The lever 67 is fulcrumed upon the frame 6 and a link 69 rises therefrom to a bell crank 70 to which it is attached and which is mounted on the frame 6. A link 71 extends forward from the bell crank 70 to a hand lever 72 mounted adjacent the levers 37 and 40 and cooperating with the usual holding rack. By this arrangement, the carrier and the cutter may be moved to the left as desired and held in the set position and the rod 66 may always move through the lever 67 as the cutter is forced inward when the shoe 43 meets an obstruction. At the outer or right hand end of the frame 45 is mounted a pulley or drum 73 upon the periphery of which is wound a cable 74 having one end secured to the drum and its other end secured to the carrier 44. A coiled spring 75 is disposed about the axis of the drum with one end secured thereto and the other end secured to the drum. When the carrier and cutter are moved to the left, the drum will be rotated to wind the spring and, when the obstruction has been passed, the unwinding of the spring will return the cutter to the right and its normal working position.

Secured to the frame 45 is a bracket 76 to which is attached the lower end of a link 77 which has its upper end attached to a bell crank 78 mounted on the frame 6. From the bell crank 78 a second link 79 extends to a bell crank 80 which in turn is connected by a link 81 with a hand lever 82. The frame 45 may thus be raised or lowered as desired, and a U-shaped frame or guide 83 is secured to the frame 6 and depends therefrom around the frame 45 to hold the latter to a vertical plane as it is raised or lowered and thereby overcome possible strain caused by side draft.

The finger bar of the cutter 41 is hinged to the carrier 44 in the usual manner and, at the hinge, is provided with a small crank 84 to which is attached a chain or cable 85 which extends to a drum on the frame 6 upon which it may be wound to raise the cutter from the ground. Any approved means may be provided for operating the winding drum, Fig. 3 showing beveled gearing 86 connecting the drum with a shaft 87 which is connected through belt gearing 88 with a hand wheel 89 arranged within convenient reach of the operator.

The shaft 59 has a crank 90 formed therein and a rod 91 is pivoted to the crank, said rod extending laterally to a crank disk 92 which is mounted upon a frame 93 which extends to the right in advance of the carrier 44, as shown in Fig. 2. The frame 93 is formed with a fork 94 at its left end which is rotatably fitted upon stub journals on the frame 48, whereby the frame may be raised and lowered. An arcuate finger bar 95 depends from the right hand end portion of the frame 93 and is adapted to enter a ditch at the side of the road, as will be understood upon reference to Fig. 3. Reciprocably mounted upon this finger bar 95 is an arcuate cutter bar 96, the inner end of which is connected by a short pitman 97 with the wrist pin of the crank disk 92, so that the movement of said crank disk will be imparted to the cutter and the same reciprocated in an arcuate path. It may be noted that the frame 93 is of a drop type to provide ample clearance for the pitman. The finger bar 95 carries guard fingers 98 of well-known form, and the cutter bar 96 carries knives 99 working through the guard fingers in a well-known manner, the knives being preferably integral with the bar and flexible. At intervals, the finger bar 95 has openings or recesses formed therein, as indicated at 100, to receive anti-friction rollers 101 which support the cutter bar 96, as will be understood upon reference to Figs. 5 and 6. To provide supports for the rollers, plates 102 are secured upon the under side of the finger bar and extend across the under sides of the openings, as shown clearly in Fig. 5. At intervals alternating with the openings 100 and the plates 102, brackets 103 are fitted around the finger bar and the cutter bar, and these brackets may, if desired, be formed integral with the guard fingers, as indicated in Fig. 7. These brackets 103 are notched or slotted in their upper portions to receive anti-friction rollers 104 which rest upon the upper side of the cutter bar so as to hold the same to the finger bar and maintain it in the prescribed path while in operation. Cap plates 105 are secured upon the brackets over the rollers, as shown in Figs. 5 and 7, so as to retain the rollers in place.

The finger bar 95 is not secured directly to the frame 93 but its outer end is supported by a bracket 106, fastened on the frame, while its inner end is suspended by a hanger 107 from the same shaft to which the crank disk 92 is secured. This arrangement permits a limited movement of the cutter about the shaft to compensate for variations encountered in the ditch without changing the position of the frame 93.

The mounting of the fork 94 provides for raising and lowering of the frame 93 and, to resist side strain, the frame passes through a guide 108, the same in all respects as the guide 83. Adjacent the hand lever 82 there is provided a hand lever 109 from which a connecting rod 110 extends rearwardly to a horizontally disposed bell crank 111, and a link 112 extends from said bell crank to a vertically disposed bell crank 113 from which a link 114 depends to the frame 93 carrying the arcuate cutter. By manipulating the hand lever 109, the arcuate cutter may be set to operate at a desired height or raised to an inoperative position in a well-understood manner.

From the foregoing description, taken in connection with the accompanying drawings, it will be seen that I have provided a very simple and compact mechanism whereby vegetation may be very easily and effectually cut down at the side of the road.

It must be understood that the drawings are illustrative only and not restrictive. Instead of crank disks and a connecting rod, beveled gears or chain and sprocket gearing may be used and various other changes may be made in the minor details of the apparatus without departing from the spirit and scope of the invention as the same is defined in the following claims.

Having thus described the invention, I claim:

1. In a mowing apparatus, an arcuate cutter, means for supporting said cutter upon a tractor, and means for reciprocating the cutter in an arcuate path.

2. A mowing apparatus comprising a reciprocatory cutter, means for mounting said cutter at the rear of a tractor, an arcuate cutter, means for mounting said arcuate cutter at the rear of a tractor and in advance of the first-mentioned cutter, and means driven by the power of the tractor to reciprocate both cutters.

3. Mowing apparatus comprising a reciprocatory cutter, means for mounting said cutter at the front of a tractor, a second reciprocatory cutter, means for mounting said second cutter at the rear of the tractor, an arcuate cutter, means for mounting said arcuate cutter at the rear of the tractor and in advance of the second-mentioned cutter, and means driven by the power of the tractor to reciprocate all said cutters.

4. In mowing apparatus, a bowed cutter, a bowed finger bar supporting the cutter, means for reciprocating the cutter longitudinally of the finger bar, and anti-friction devices disposed above and below the cutter and carried by the finger bar whereby to maintain the cutter in position over the finger bar.

5. In mowing apparatus, a pendent bowed cutter, a bowed finger bar having openings therein at intervals, anti-friction devices mounted in said openings and supporting the cutter, brackets carried by the finger bar and spanning the same and the cutter bar, anti-friction devices mounted in the upper portions of said brackets to rest upon the cutter whereby the cutter will be held to the finger bar, and means to reciprocate the cutter longitudinally of the finger bar.

6. In a mowing apparatus, a flexible bowed cutter bar having knives thereon.

7. In a mowing apparatus, a flexible bowed cutter bar having flexible knives integral therewith.

8. In a mowing apparatus, a carrier mounted for movement transversely of the line of travel of the mowing apparatus, a cutter connected to and alined with the carrier, and means whereby the cutter and carrier will be moved laterally by engagement with an obstruction to pass around the obstruction.

9. In a mowing apparatus, a supporting frame, means for raising and lowering the frame, a carrier mounted to reciprocate endwise on the frame, a cutter connected to and alined with the carrier and projecting laterally beyond the frame, and means for adjusting the carrier along the frame.

10. In a mowing apparatus, a frame, a carrier mounted to reciprocate thereon, a cutter connected with the carrier and projecting laterally beyond the frame, yieldable means holding the carrier at the outer end of the frame, and means whereby when an obstruction is met the cutter and carrier will be moved in opposition to said yieldable means.

11. In a mowing apparatus, a frame, a carrier mounted to reciprocate thereon, a cutter connected with the carrier and projecting laterally beyond the frame, yieldable means holding the carrier at the outer end of the frame, and means whereby when an obstruction is met the cutter and carrier will be moved in opposition to said yieldable means, and means for operating the cutter independently of the carrier, said means including a slip joint whereby to accommodate the lateral movement of the cutter and carrier.

12. In a mowing apparatus, a frame, a carrier mounted to reciprocate thereon, a cutter connected with the carrier and a projecting beyond the frame, a spring drum on the frame, a connection between said drum and the carrier whereby the carrier will be drawn toward the outer end of the frame, means for limiting the movement of the carrier under the influence of the drum, and means at the outer end of the cutter whereby contact with an obstruction will effect inward movement of the carrier and the cutter in opposition to the drum.

13. In a mowing apparatus, a frame, a bowed cutter suspended at its ends upon the frame, and means whereby the cutter may have a limited rocking bodily movement.

In testimony whereof I affix my signature.

JAMES H. TODD. [L. S.]